UNITED STATES PATENT OFFICE.

CARL GRÜNZWEIG AND PAUL HARTMANN, OF LUDWIGSHAFEN-ON-THE-RHINE, GERMANY.

ARTIFICIAL STONE.

SPECIFICATION forming part of Letters Patent No. 247,636, dated September 27, 1881.

Application filed June 23, 1881. (Specimens.) Patented in England November 16, 1880, in France January 23, 1881, in Belgium February 15, 1881, and in Germany April 28, 1881.

*To all whom it may concern:*

Be it known that we, CARL GRÜNZWEIG and PAUL HARTMANN, both of Ludwigshafen-on-the-Rhine, Germany, have invented a new and useful Composition of Matter to be Used in the Manufacture of Artificial Stone, of which the following is a specification.

The object of our invention is to provide a new and improved brick or stone which is light but strong, and is especially adapted for partitions in upper stories which are not supported by a lower partition.

In carrying out our invention we mix the following ingredients, in the proportions given, viz: pulverized cork, eight parts, by weight; clay, sand, and cement, nine and a half parts, by weight; hydrate of lime, three parts, by weight; soluble glass, one and a half part, by weight, and a suitable quantity of hair and fiber for binding purposes and enough water to make the mass plastic.

The cork is disintegrated or reduced by any suitable means. The hair can be replaced by any other suitable fibrous material. This mixture is pressed into suitable molds to form bricks, which are finished and hardened by drying them in the air.

The clay serves to prevent the lime from separating from the cork, and the soluble glass serves chiefly to protect the various components from dampness and decay, and to form silicates of lime, which add to the strength of the brick.

The hair or other fibers binds the material together while drying.

Having thus fully described our invention, we claim as new and desire to secure by Letters Patent—

An artificial stone formed of pulverized cork, clay, sand, and cement, hydrate of lime, soluble glass, hair, and water, in about the proportions specified.

In testimony whereof we have signed our names to this specification in the presence of two subscribing witnesses.

DR. C. GRÜNZWEIG.
PAUL HARTMANN.

Witnesses:
XAVER BIEBER,
KETH PEH.